United States Patent Office 2,984,499
Patented May 16, 1961

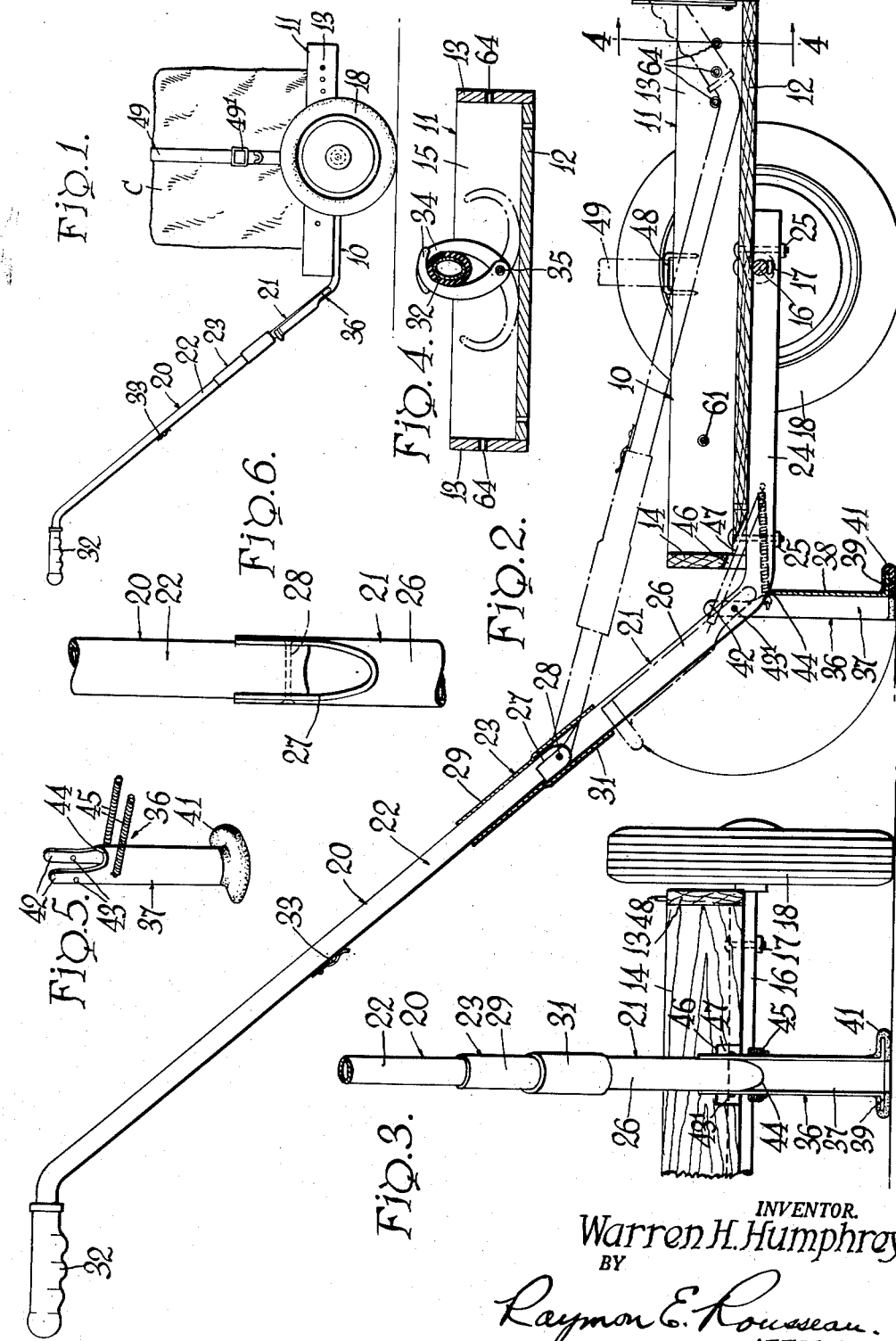

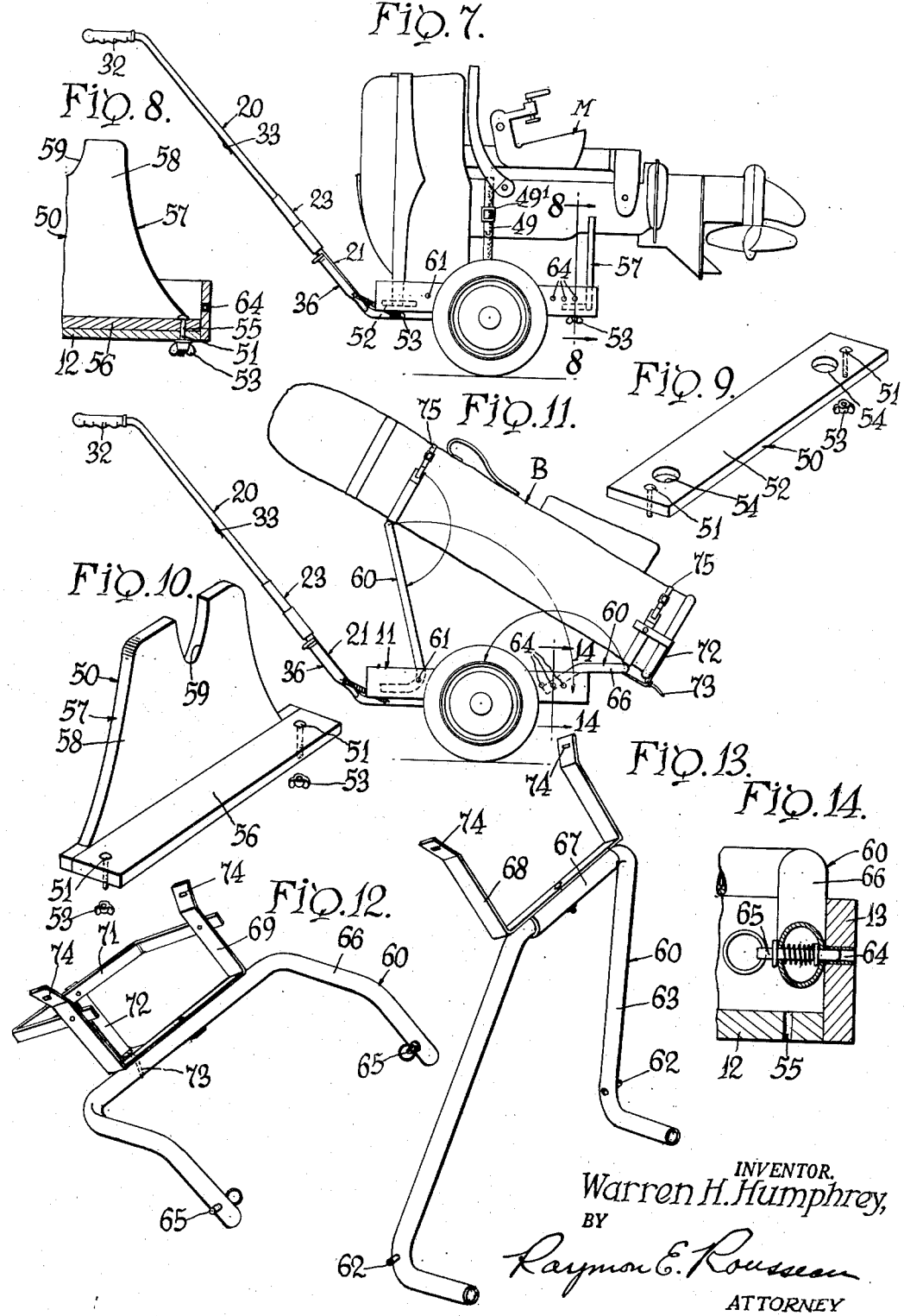

2,984,499
CART SELECTIVELY ADAPTABLE TO MULTIPLE USES
Warren H. Humphrey, R.F.D. 1, Warsaw, N.Y.
Filed Nov. 9, 1960, Ser. No. 68,198
12 Claims. (Cl. 280—47.18)

The present invention relates to two wheeled hand propelled carts for transporting small heavy articles and more particularly to such carts and means for selectively converting and adapting them for several specifically different uses.

It has been found that while the cart shown in my pending application Serial Number 789,704, now abandoned is very useful for transporting many small heavy articles it requires special novel means for converting and adapting it for use in satisfactorily transporting a golf bag or an outboard motor.

Accordingly the cart disclosed in said pending application has been modified to allow its selective conversion and adaptation from its original transporting uses to the additional selective specific uses of transporting either a golf bag or an outboard motor by detachably securing thereto suitable golf bag supporting and securing means or suitable outboard motor supporting and securing means.

This application is a continuation-in-part application of the above noted copending application Serial Number 789,704 filed January 28, 1959, now abandoned and includes by reference the disclosure set forth in said copending application.

The objects of the present invention are to provide a simple, inexpensive and easily operated two-wheeled hand propelled cart which is selectively adaptable for transporting each of a number of different heavy articles from place to place; to provide such a cart with a handle means operable to detachably hold inner and outer pivotally connected handle parts alined for use in manipulating the cart and operable to allow swinging the outer part over the cart to reduce the space required for storing it; to provide the cart with means for detachably securing the outer handle part in its folded position; to provide the cart with a leg pivotally connected to the handle for swinging movement thereby from an angular position engaging the ground and supporting the cart in a desired position to a folded position partially embracing and alined with the handle; to provide spring means arranged between the handle and leg for moving said leg toward and holding it in either of its positions; and to form said cart to selectively receive and detachably secure parts of an outboard motor supporting means and a golf bag supporting means thereto.

These and other objects and advantages of the present invention will appear from a perusal of the following detailed description and the drawings herein.

In the drawings:

Figure 1 is a side elevational view showing the cart of the present invention adapted for use in carrying a heavy business machine held therein by a suitable strap.

Figure 2 is an enlarged sectional view taken longitudinally and centrally of the cart and showing its leg in a cart supporting position in full lines and in a folded position in dot and dash lines. This figure also shows the cart handle in its position of use in full lines and in its folded position in dot and dash lines.

Figure 3 is a fragmentary front elevational view of Figure 2.

Figure 4 is a transverse vertical sectional view taken on line 4—4 of Figure 2.

Figure 5 is a perspective view of the cart supporting leg.

Figure 6 is a rear elevational view of the pivotal joint between the inner and outer handle sections with the sleeve means for maintaining said handle sections in alinement removed.

Figure 7 is a side elevational view of the cart provided with detachable members for alining and supporting an outboard motor.

Figure 8 is a fragmentary vertical sectional view taken on the line 8—8 of Figure 7.

Figures 9 and 10 are perspective views of the outboard motor alining and supporting members shown in Figure 7.

Figure 11 is a side elevational view of the cart provided with detachable members movable from folded positions to extended positions for alining, supporting and maintaining a golf bag thereon.

Figures 12 and 13 are perspective views of the golf bag alining and supporting members shown in Figure 11 with the bag maintaining straps removed therefrom, and Figure 14 is an enlarged vertical cross sectional view taken on the line 14—14 of Figure 11.

Generally stated the cart of the present invention comprises a body, in the form of a box of a size and strength, formed to selectively receive and carry any small heavy article, especially small heavy business machines, outboard motors and golf bags; a pair of wheels for the body of a size and arranged to allow pulling the body up and over obstructions such as street curbs; a handle having a first handle part secured to the body, a second handle part having its outer end provided with a handle grip and its inner end pivotally connected to the outer end of the first handle part, and a third handle part formed and movably carried by the second handle part to allow movement to a position in which said part engages the first handle part, and thereby secures and holds the first and second handle parts alined for use as a handle in propelling the cart from place to place, and to allow movement of said part to another position in which the second handle part may be swung rearwardly to overlie the body, thereby reducing the space required for storing the cart; means carried by the body and engageable with the second handle part for releasably securing said handle part in its folded position; a leg pivotally connected to the first handle part and movable by manipulating the second handle part, for swinging movement from an operative position in which said leg cooperates with the wheels in maintaining the body in a predetermined relation to the ground, to an inoperative position, in which said leg extends outwardly along the first handle part and allows the cart to be readily propelled over curbs and other obstructions; a resilient means connected between the first handle part and the leg for automatically moving and resiliently holding said leg, in the selected one of its two positions when it is swung a predetermined distance.

Referring now to the drawing wherein like reference characters denote like parts, the numeral 10 generally designates the cart of the present invention wherein a box-like body 11, formed with a bottom wall 12, side walls 13 and end walls 14 and 15, may be fabricated of any suitable material, which may be, for example, pieces of water-proof plywood known as "Weldwood." An axle 16, being secured in transverse relation to the bottom wall 12 as by the fastening devices 17 about midway between its end walls, has each of its extended outer ends provided with a suitable wheel 18. The wheels 18 are rotatably secured upon the axle 16 and, being preferably provided with a rubber tire, are of such a size that the cart may be readily propelled up and over obstructions such as side walk curbs.

A handle generally designated by the numeral 20 comprises a first handle part 21, a second handle part 22, and a third handle part 23. The handle parts 21, 22 and 23 are preferably formed of lightweight thin wall metal tubing to provide a light, strong and attractive appearing handle.

The first handle part 21 is formed with a rear portion 24 which is secured to the bottom wall 12 midway between and parallel to the side walls 13, as by fastening devices 25, and is formed with a forwardly and upwardly extending portion 26, the outer end of which is cut away as at 27, as shown in Figures 2 and 6 to receive the suitably formed inner end of the second handle part 22. The inner end of the part 22 is pivotally secured to the outer end of the portion 26 by a pivot pin 28 which has its outer ends flush with the surface of the portion 26 and enlarged to prevent its displacement, and which is located to allow swinging the part 22 thereabout between a position in which it is axially alined with the part 26 (Figures 1 and 2) and a position in which it is folded over the body 11 as indicated by dot and dash lines in Figure 2.

The third handle part 23 is preferably formed as a two-diameter sleeve having its smaller diameter portion 29 carried by and slidable upon the second handle part 22 and having its larger diameter portion 31 of a size to snugly embrace the outer end of the portion 26 and the pivot pin 28 in the manner shown in Figure 2. So formed and positioned, the part 23 prevents swinging movement between the pivoted handle parts 21 and 22 until it is desired to store the cart, whereupon, the part 23 is slid outwardly beyond the part 26 to the position shown in broken lines in Figure 2, and the part 22 is folded over the body 11 as shown by broken lines in Figure 2, whereby the cart requires less storage space than when the part 22 is alined with the portion 26.

The part 22 has its outer end portion formed and provided with a suitable handle grip 32 to facilitate use of the cart, and between said grip and the pivot pin 28, is provided with a suitably formed combined stop and clip 33 which serves to determine the outward position of the part 23 and to removably secure it, thereby preventing it from getting between and being damaged when the handle sections are being alined.

In order to hold the handle part 22 in its folded position so that it may be grasped and used as a means for carrying and manipulating the cart within a storage space, one or a pair of the hook-like members 34 are pivotally secured to the rear wall 15 as by a screw or rivet 35. The members 34, being formed, located and positioned as shown in full lines in Figure 4 serve to hold the handle part 22 in its folded position and when the members 34 are positioned as shown in broken lines in Figure 4 the handle part 22 may be swung into its other above described position.

A novel means for supporting the cart in the position shown in Figure 2 is generally indicated by the numeral 36 and includes a leg 37, having its upper end portion pivotally connected to the portion 26 by a pivot pin 43', so that it may be swung from the downwardly projecting full line body supporting position of Figure 2 in which its free end engages the ground and prevents the body 11 from tipping forwardly and downwardly about the axle 16, into the broken line non-supporting position in which it is in contiguous parallel relation to the portion 26 so as not to interfere with movement of the cart up and over curbs.

In a presently preferred construction, the leg 36 is formed with a straight light sheet metal portion 38 which is semi-cylindrical in cross-section to increase its resistance to bending under load in its body-supporting position and to partially embrace the portion 26 in its non-supporting position; whereby it presents a pleasing appearance. The free end of the leg 37 is formed with an outwardly projecting flange which provides an enlarged foot portion 39, which, in order to prevent marring any surface upon which it is placed, and for another purpose to be hereinafter described, is encased by a resilient member such as the rubber shoe 41. The upper end portion of the leg 37 is cut away, as best shown in Figure 5, to provide a pair of arms 42, each formed with a hole 43 to receive the pivot pin 43' and to provide a surface 44 which is located and shaped to engage the portion 26 and thereby act as a stop for the leg 37 when it is positioned in its body supporting position.

The leg 37 is resiliently held in its body supporting and its non-supporting positions by resilient means, preferably in the form of a pair of tensioned helically wound springs 45 each having one end connected to the leg 37 and its opposite end connected to the portion 24, whereby the springs 45, being under tension, and being further tensioned by and during swinging movement of the leg 37 to either of its positions, act to snap and resiliently hold the leg 37 in the position selected.

Since the outer corner between the front wall 14 and the bottom wall 12 would prevent the springs 45 from moving to their broken line position of Figure 2 wherein they hold the leg 37 in its non-supporting broken-line position, these surfaces are notched as at 46 to receive and allow the necessary movement of the springs 45. The notches 46 cut across the inner corner between the walls 14 and 12 so that they provide the openings 47 which serve to drain the body of any liquids which may get into it.

When the handle part 22 and the leg 37 are both in their folded broken line positions it has been found by experimentation that the cart can be conveniently carried from place to place by grasping the portion 26 and the folded leg adjacent its foot portion 39 and that when so grasped the resilient shoe member 41 prevents injury to the user's hand.

The article placed in the body may be encased and protected against the elements by a suitable cover "c," as indicated in Figure 1, and to insure against inadvertent shifting of the article during transportation, each side wall 13 of the cart may be formed with a strap receiving means or provided with a staple 48 formed and arranged to slidably receive a suitable strap 49, the strap 49 being drawn tightly about the article and secured in place by fastening means such as the buckle 49' serves to removably secure the article in place.

Assuming that it is desired to move the leg 37 from its body supporting position to its non-supporting position and that the handle parts 21 and 22 are held by the part 23 in the relation shown in full lines in Figure 2, the operator grasps the handle grip 32 and swings the handle in a downward and rearward direction thereby to cause the leg 37 to swing forwardly and upwardly about the pivot pin 38 a predetermined distance, and thereby to position the springs 45 whereby they automatically act to move the leg into and resiliently hold it in its non-supporting position.

Assuming that it is now desired to move the leg 37 from its non-supporting position to its body supporting position, the operator simply exerts toe pressure against the foot portion 39 of the leg 37, thereby causing it to swing downwardly and rearwardly about the pivot pin 43 a predetermined distance, and thereby positioning the springs 45 whereby they automatically act to move the leg into and resiliently hold it in its body supporting position.

Advantages of forming and operating the novel leg means in the manner above described are that such means are simple and inexpensive to form and allow a simple fool-proof operation which does not require operation by hand or any stooping or bending on the part of the operator.

In order to allow the selective adaptation of the cart 10 for transporting an outboard motor supporting means 50, the bottom wall 12 adjacent its front end is provided with a spaced pair of transversely aligned through holes each formed to receive one of a pair of bolts 51, carried by a flat member 52 which is detachably secured in place upon said wall as by applying suitable thumb nuts 53 to the bolts 51 as in Figure 7.

The member 52, being provided with a pair of holes 54 spaced to receive the usual foot portions of an outboard motor "M," serves to prevent shifting movement of the motor when it is properly positioned in the cart as shown in Figure 7. The bottom wall 12 adjacent its rear end is provided with a pair of transversely alined through holes 55 each formed to receive one of another pair of the bolts 51 which are carried by a base portion 56 of an L-shaped motor supporting bracket 57 which is detachably secured in place upon the wall 12 as by applying another of the thumb nuts 53 to each of the bolts 51. The upright leg 58 of the bracket 57 has its upper edge portion formed with a suitably shaped notch 59 to receive and support the leg of the motor "M" therein, and may be formed to bear against and be reinforced by the rear wall 15 of the cart. The strap 49 may then be used to secure the motor "M" in place as shown in Figure 7.

The cart 10, in order to allow its selective adaptation for use in transporting a golf bag has each of its side walls 13 adjacent their front ends provided with a pair of transversely alined bushed holes 61 for receiving and detachably securing an alined pair of pins 62 carried by the lower end portion of a front frame 63 of a golf bag supporting means 60, and said walls adjacent their rear ends are provided with a plurality of spaced transversely alined bushed holes 64 for receiving and detachably securing an alined pair of manually operable spring actuated pins 65 (Figure 14) carried by the inner end portion of a rear frame 66 of the means 60.

As indicated in Figure 11 by arrows, the frames 63 and 66 are swingable from collapsed space saving positions in the cart (not shown) to the golf bag supporting positions shown in this figure, and a sleeve 67 pivotally secured to the inwardly directed alined arms of the frame 63 carries a U-shaped yoke 68 so that said yoke may be swung from its golf bag retaining position shown in Figures 11 and 13 to a position allowing the frame 63 to be swung to its collapsed position. The frame 66 rigidly carries a U-shaped yoke 69 having its arms connected by a U-shaped yoke 71 extending normal thereto, thereby to receive and support the lower end portion of a golf bag "B." The yoke 71 midway between its arms is connected by an L-shaped strap member 72 to the bight portion of the frame 66 for reinforcing it, and one of the legs of the strap 72 is provided with a sharpened pin 73 which when the cart is tilted rearwardly and downwardly enters the ground and prevents inadvertent movement of the cart on flat or inclined ground surfaces.

The outer end portions of the yokes 68 and 69 are inclined outwardly to facilitate entrance of the golf bag "B" therebetween and are each provided with a slot 74 to receive a strap 75 for securing the bag in place as shown in Figure 11.

To anyone skilled in the art it should now be apparent that my improved cart 10 is not only usable generally as before to transport a number of different heavy articles, but that since its bottom wall 12 is now provided with the pair of front holes and the pair of rear holes 55 and its side walls 13 are now provided with the alined holes 61 and 64 the present cart 10 is readily adaptable by detachably connecting the means 50 or the means 60 thereto in the manner described to selectively connect it for the specific different uses of transporting an outboard motor or a golf bag.

It should be understood that the herein shown and described form of cart is intended to exemplify the principles of the present invention and that various modifications and rearrangements of its component parts may be made within the scope of the appended claims, wherein:

I claim:

1. An improved two-wheeled hand propelled cart for transporting heavy articles, comprising a box-like body, said body being formed with a rectangular bottom wall having its sides and ends adjoined by upright side and end walls, and transversely supported intermediate its end walls by a transverse axle directly secured to the bottom wall and a wheel at each end of the axle, the juncture of the bottom and front end walls of said body being formed with a spaced pair of alined slots each providing a drainage opening for the body and each providing a space for one of a pair of leg actuating tension springs in one of their positions; a handle directly secured to the bottom wall midway between its sides and the slots, said handle being bent adjacent the front end of said wall to extend forwardly and upwardly therefrom and having its forward end provided with a hand grip; a leg pivotally connected to the handle adjacent the forward end of the body, said leg being semi-circular in cross section and having its one end portion cut away to provide an integral stop forming surface between a spaced pair of integral arms pivotally connected to the handle for swinging movement of the leg between a collapsed position seated upon and embracing the handle to an extended position wherein its other enlarged end engages the ground and prevents forward tipping of the cart; and a pair of tension springs each having one end pivotally connected to one side of the leg forward of its pivotal connection to the handle and its other end pivotally connected to the handle rearwardly of said pivotal connection, each of said springs being freely extended through one of the slots to allow holding the leg resiliently in its first mentioned position and acting automatically to move the leg from its second mentioned position to its first mentioned position when it is swung a predetermined distance theretoward by manually exerting a rearward and downward force on the handle.

2. An improved two-wheeled hand propelled cart as set forth in claim 1, wherein the other end portion of the leg is formed with an integral outwardly extending reinforcing flange providing a semi-circular foot, and a resilient material encases said foot and serves the dual function of preventing marring a surface engaged by the foot and preventing injury to a user's hand when the leg is in its first mentioned handle embracing position and is grasped together with the adjacent handle portion for bodily transporting the cart.

3. An improved two-wheeled hand propelled cart as set forth in claim 1 wherein the handle is foldable over the cart to conserve storage space and comprises an outer tubular handle section extending into and having a pivotal connection to the outer end of an inner handle section formed to allow swinging movement of the outer section from a position alined therewith to a folded position over the cart, said pivotal connection being a transversely and diametrically disposed pivot pin carried by the inner section and having its enlarged ends flush therewith, and a tubular handle section alining sleeve formed with a smaller diameter section slidably carried by the outer handle section, an axially alined larger diameter section slidably engageable over the flush ends of the pivot pin and upon the inner handle sections for maintaining said handle sections alined and an integral internal shoulder adjoining the smaller and larger diameter sections and providing a stop for determining the handle sections alining position of said sleeve thereon.

4. An improved two wheeled hand propelled cart as set forth in claim 3 wherein the outer handle section is provided with a combined stop and clip for determining and releasably maintaining the alining sleeve in a position preventing damage thereto while the handle sections are being folded.

5. An improved cart as set forth in claim 1, wherein the cart is selectively adaptable for use in supporting and transporting an outboard motor by providing opposite ends of its bottom wall with spaced pairs of through holes to receive like pairs of bolts carried by a flat plate, and the base plate of an upstanding L-shaped bracket and by providing each bolt with a nut-like device operable to detachably secure said flat plate and said base plate in their predetermined positions upon said bottom wall, said flat plate being provided with means spaced to engage and prevent shifting movement of like spaced supporting feet of the motor, and said L-shaped bracket being provided with means at the top central portion of its upright leg for centering, supporting and detachably maintaining the drive leg housing of the motor against side-wise movement, and means carried by the cart and engageable with the motor for detachably securing it in place on the cart.

6. An improved cart as set forth in claim 5 wherein the spaced leg engaging means of the flat plate comprise openings spaced and shaped to snugly receive the motor feet, and the centering, supporting and maintaining means of the bracket comprises a notch in its upright leg formed to receive and snugly engage the drive leg housing of the motor.

7. An improved cart as set forth in claim 1, selectively adaptable for use in supporting and transporting a golf bag wherein each of its side walls are provided with transversely alined pairs of front and rear holes for detachably receiving and pivotally mounting front and rear golf bag supporting means thereon, said front means including an inverted U-shaped frame having its side legs provided with alined pivot pins pivotally connectable in said front holes for movement between a substantially upright bag supporting operative position and a substantially horizontal inoperative position, said rear means including a U-shaped frame having its side legs provided with alined pivot pins pivotally connectable in said rear holes for movement between a horizontal bag supporting operative position overlying the rear wall of the cart to an inoperative position, whereby said frames in their operative positions support the golf bag in a forwardly and upwardly inclined position providing ready access to its contents, and in their inoperative position lie within the cart to conserve storage space.

8. An improved cart as set forth in claim 7 wherein the bight portions of the front and rear frames are each provided with a central yoke formed to receive and prevent lateral displacement of the golf bag thereon.

9. An improved cart as set forth in claim 8 wherein the front yoke is pivotally connected to the front frame to allow moving said frame to its inoperative position.

10. An improved cart as set forth in claim 8 wherein the rear frame and yoke carry supporting means engageable by the bottom wall of the bag for preventing endwise movement thereof.

11. An improved cart as set forth in claim 10 wherein the bag end supporting means carries a sharpened pin engageable with the ground by tipping the cart to prevent inadvertent movement of the cart along said ground.

12. An improved cart as set forth in claim 8 wherein each yoke is provided with means for detachably securing the bag therein.

No references cited.